United States Patent
Kuriki

(10) Patent No.: US 8,541,895 B2
(45) Date of Patent: Sep. 24, 2013

(54) ENERGY REGENERATING DAMPER

(75) Inventor: Nobuharu Kuriki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 13/499,984

(22) PCT Filed: Sep. 27, 2010

(86) PCT No.: PCT/JP2010/005790
§ 371 (c)(1),
(2), (4) Date: Apr. 3, 2012

(87) PCT Pub. No.: WO2011/043027
PCT Pub. Date: Apr. 14, 2011

(65) Prior Publication Data
US 2012/0193919 A1    Aug. 2, 2012

(30) Foreign Application Priority Data

Oct. 5, 2009   (JP) ................................. 2009-231755

(51) Int. Cl.
*B60K 17/00*    (2006.01)

(52) U.S. Cl.
USPC ........................................... 290/1 R; 290/54

(58) Field of Classification Search
USPC .................................... 290/1 R, 54
See application file for complete search history.

(56) References Cited

U.S. PATENT DOCUMENTS

| | | | | |
|---|---|---|---|---|
| 3,507,580 A | * | 4/1970 | Howard et al. | ............... 417/231 |
| 7,541,684 B1 | * | 6/2009 | Valentino | .................... 290/1 R |
| 8,283,795 B2 | * | 10/2012 | Khoury et al. | ............... 290/1 R |
| 8,376,100 B2 | * | 2/2013 | Avadhany et al. | ............ 188/316 |
| 2007/0089924 A1 | * | 4/2007 | de la Torre et al. | ........... 180/305 |
| 2008/0277939 A1 | * | 11/2008 | Richardson et al. | ............. 290/50 |
| 2008/0290624 A1 | | 11/2008 | Yamanaka et al. | |
| 2009/0229902 A1 | * | 9/2009 | Stansbury, III | ............... 180/165 |
| 2010/0117277 A1 | * | 5/2010 | Ohta et al. | ............... 267/140.14 |
| 2010/0207309 A1 | * | 8/2010 | Park | .............................. 267/195 |
| 2013/0127175 A1 | * | 5/2013 | Zuo et al. | ..................... 290/1 A |

FOREIGN PATENT DOCUMENTS

| | | | | |
|---|---|---|---|---|
| DE | 3522221 A | * | 2/1986 | |
| JP | 05122921 A | * | 5/1993 | |
| JP | 5-050195 U | | 7/1993 | |
| JP | 5-050196 U | | 7/1993 | |
| JP | 2003-064743 A | | 3/2003 | |
| JP | 2007302193 A | * | 11/2007 | |
| JP | 2008-121759 A | | 5/2008 | |
| JP | 2008-286362 A | | 11/2008 | |
| JP | 2009-115301 A | | 5/2009 | |

* cited by examiner

*Primary Examiner* — Joseph Waks
(74) *Attorney, Agent, or Firm* — Carrier Blackman & Associates, P.C.; Joseph P. Carrier; William D. Blackman

(57) ABSTRACT

An energy-regenerating damper including a piston provided with a housing fitted inside a cylinder so as to be able to slide against the inner surface of the cylinder, a stator contained in/fixed to the inside of the housing, a rotor supported so as to be able to rotate inside the stator, and damping valves provided at the top and bottom ends of the housing. The housing includes an upper half and a lower half fastened together by bolts, and a damper rod is fixed to the top end of the upper half. The upper half and the lower half each contain a bearing for supporting the rotor. A plurality of orifices through which a hydraulic oil circulates are drilled towards the outsides of the upper half and lower half, and circulation holes through which the hydraulic oil circulates are drilled towards the insides of the upper half and lower half.

7 Claims, 8 Drawing Sheets

ENERGY REGENERATING DAMPER

FIELD OF THE INVENTION

The present invention relates to an energy regenerating damper that can convert kinetic energy of the working fluid into electric energy, and in particular to a technology for providing a damper that demonstrates a large extension and retraction stroke and is highly simple in structure.

DESCRIPTION OF THE BACKGROUND ART

A previously proposed telescopic damper (energy regenerating damper) for use in a wheel suspension system of a vehicle is configured to convert the kinetic energy of the working fluid which is produced as the piston undergoes a reciprocating movement in the cylinder into electric energy with the aim of contributing to the charging of the onboard battery and reducing the rise in the temperature of the working fluid. More specifically, a rotating member (turbine) is provided in a lower part of the piston and the turbine is connected to a generator rotor of a generator provided in an upper part of the piston via a rod (See Patent Document 1). As the piston along with the piston rod is displaced along the axial direction, the turbine (and hence the generator rotor of the generator) is rotatively actuated by the working fluid, and this produces electric power on the one hand, and reduces the rise in the temperature of the working fluid on the other hand because a smaller part of the kinetic energy is converted into heat.

Patent Document 1: JP UM05-050196A

BRIEF SUMMARY OF THE INVENTION

Task to be Accomplished by the Invention

In the energy regenerating damper disclosed in Patent Document 1, because the turbine and the electric generator are provided separately in the lower and upper parts of the piston, respectively, and the turbine is retained in a holder which is axially elongated, the effective axial length of the piston is increased, and this limited the stroke length of the damper. Also, because the turbine and the generator have to be individually assembled to the piston, the resulting increase in the number of component parts and work steps causes the manufacturing cost to be unacceptably high.

The present invention was made in view of such problems of the prior art, and has a primary object to provide an energy regenerating damper that demonstrates a large extension and retraction stroke, and is highly simple in structure.

Means to Accomplish the Task

According to a first aspect of the present invention, the present invention provides an energy regenerating damper including a cylinder filled with fluid and connected to one of a vehicle side member and a wheel side member, a piston internally separating the cylinder into a first fluid chamber and a second fluid chamber and axially moveable in the cylinder, a rod connecting the piston to the other of the vehicle side member and the wheel side member and an energy regenerating unit; wherein the energy regenerating unit comprises: a stator integrally formed with the piston and provided with a plurality of stator coils; and a rotor rotatably supported in the piston and provided with a plurality of magnetic poles opposing the stator coils, the rotor being configured to be rotatively actuated by the fluid when the piston moves axially in the cylinder.

According to a second aspect of the present invention, in the energy regenerating damper based on the first aspect of the present invention, the stator is provided with an annular or cylindrical shape, and the stator coils are formed on an inner circumference of the stator while the magnetic poles are formed on an outer circumference of the rotor.

According to a third aspect of the present invention, in the energy regenerating damper based on the first aspect of the present invention, the rotor is provided with an annular or cylindrical shape, and the stator coils are formed on an outer circumference of the stator while the magnetic poles are formed on an inner circumference of the rotor.

According to a fourth aspect of the present invention, in the energy regenerating damper based on the first aspect of the present invention, the piston is provided with a housing that slidably fitted in an inner circumference of the cylinder, and the stator and the rotor are received in the housing.

According to a fifth aspect of the present invention, in the energy regenerating damper based on the fourth aspect of the present invention, the housing comprises a bearing supporting the rotor, a communication hole for conducting the fluid to the rotor and an orifice that applies a flow resistance to the fluid.

According to a sixth aspect of the present invention, in the energy regenerating damper based on the first aspect of the present invention, the energy regenerating damper further comprises an electric current control unit interposed between an onboard battery and the energy regenerating unit, the electric current control unit selectively supplying electric current generated by the energy regenerating unit to the onboard battery and supplying drive electric current from the onboard battery to the rotor.

According to a seventh aspect of the present invention, in the energy regenerating damper based on the first aspect of the present invention, the rotor is provided with a spiral or helical shape so as to be rotatively actuated by the fluid.

Effect of the Invention

According to the present invention, as opposed to the conventional arrangement where the rotation of a rotatable member provided separately from the piston is transmitted to an electric power generator for the actuation thereof, the rotor of an energy regenerating means in the energy regenerating damper is caused to be rotated by the flow of the fluid so that the effective axial dimension of the piston can be minimized while an adequate extension and retraction stroke is ensured. Because the piston is integrally incorporated with the stator and the rotor, the piston is not required to be combined with an electric power generator or a rotatable member so that the assembly work can be simplified. When the housing is provided with a communication hole and an orifice, not only the fluid introduced from the communication hole is utilized for rotating the rotor but also the fluid passed through the orifice produces a damping force. When the damper is combined with a current control unit, the load of the alternator can be reduced and/or the damping force of the damper can be adjusted. When the rotor is provided with a spiral or propeller-like screw member, the flow of the working fluid causes the rotor to rotate, and the resulting rotation of the magnetic poles relative to the stator produces an induced electromotive force that is required for electric power generation.

DETAILED DESCRIPTION OF THE INVENTION

Several embodiments of the present invention as applied to an energy regenerating damper for a rear wheel suspension system of a four wheel motor vehicle are now described in the following with reference to the appended drawings.

[First Embodiment]

<Structure of the First Embodiment>

As shown in FIG. 1, a rear wheel suspension system 1 given as a first embodiment of the present invention essentially consists of a H-type torsion beam wheel suspension system, and comprises a pair of trailing arms 2 and 3 that support a pair of rear wheels 7 and 8, a torsion beam 4 connecting intermediate parts of the trailing arms 2 and 3 with each other, a pair of suspension springs consisting of coil springs 5 and a pair of dampers 6. Each damper 6 in this case consists of an energy regenerating damper, and a damper ECU 9 and a current control unit 10 installed in the trunk space variably control the power generating and damping actions of the damper 6.

<Damper>

As shown in FIG. 2, the damper 6 of the first embodiment is of a mono-tube type (de Carbon type), and comprises a cylinder 12 filled with working fluid, a damper rod 13 axially slidably received in the cylinder 12, a piston 16 attached to a free end of the damper rod 13 and separates the interior of the cylinder 12 into an upper fluid chamber (first fluid chamber) 14 and a lower fluid chamber (second fluid chamber) 15, a free piston 18 defining a high pressure gas chamber 17 in a lower part of the cylinder 12, a cover 19 protecting the damper rod 13 from contamination by dust and a bump stop 20 for damping the shock at the time of the full bound.

The cylinder 12 is connected to the upper face of a railing arm (wheel side member) 2 via a threaded bolt 21 passed through an eye piece 12a provided in the lower end of the cylinder 12. The upper end of the damper rod 13 is formed as a threaded shaft 13a by which the damper rod 13 is connected to a damper base (wheel house upper) (vehicle body side member) 25 via a pair of rubber mounts 22 and 23 and a nut 24.

<Piston>

As shown in FIG. 3, the piston 16 comprises a housing 31 slidably received within the inner circumferential surface of the cylinder 12, a stator 32 fixedly received in the housing 31, a rotor 33 rotatably retained inside the stator 32 and a pair of damping valves 34 and 35 provided on the upper and lower ends of the housing 31, respectively.

The housing 31 consists of an upper half 31a and a lower half 31b which are secured to each other via threaded bolts 36. The damper rod 13 is fixedly attached to the upper end of the upper half 31a. The upper half 31a and the lower half 31b are each incorporated with a bearing 39 for supporting the rotor 33, and are each provided with a plurality of orifices 37a, 37b for the working fluid in an outer peripheral part thereof and a plurality of communication holes 38a, 38b for the working fluid in an inner peripheral part thereof.

As shown in FIG. 4 also, the stator 32 comprises a cylindrical stator main body 41 made of non-magnetic material such as aluminum and stator coils 42 embedded or encapsulated in the stator main body 41. The stator coils 42 consist of 48 individual coils in vertical rows of four coils arranged along a concentric angle each at an angular interval of 30 degrees. The stator main body 41 is formed with orifices 43 that communicate with the orifices 37a and 37b of the housing 31.

The rotor 33 comprises a shaft portion 45 supported by the bearings 39 of the housing 31 and a spiral screw member 46 formed on the outer circumference of the shaft portion 45. The screw member 46 is made of non-magnetic material such as aluminum, and is incorporated with magnetic poles 47S (S poles) and 37N (N poles) made of permanent magnets on the outer circumference thereof at an angular interval of 45 degrees as indicated by the cross hatching in FIG. 4.

<Current Control Unit>

The current control unit 10 essentially consists of a voltage boost circuit, a

PWM circuit and switching devices, and is interposed between an onboard battery 51 and the damper 6. The current control unit 10 is controlled by a control signal received from the damper ECU 9, and selectively supplies the electric current produced from the damper 6 to the onboard battery 51 and the drive current from the onboard battery 51 to the damper 6.

<Mode of Operation of the First Embodiment>

As the vehicle starts traveling, the damper 6 is telescopically extended and retracted according to the surface irregularities and the unevenness of the road surface and the pitching and rolling movements of the vehicle body, or, in other words, the piston 16 axially reciprocates in the cylinder 12 causing the working fluid to move from one of the upper and lower fluid chambers 14 and 15 to the other. For instance, as shown in FIG. 3, when the damper 6 is telescopically retracted, the piston 16 moves downward in the cylinder 12, and a damping force is produced as a part of the working fluid flows upward via the orifices 37b, 43 and 37a and another part of the working fluid flows upward through the central bore of the stator main body 41 via the communication holes 38a and 38b.

As the rotor 33 is rotatably supported by the housing 31 at the shaft portion 45 thereof, when the piston 16 moves downward in the cylinder 12, the screw member 46 is caused to turn in counterclockwise direction as seen in plan view by the working fluid striking the screw member 46. As a result, the magnetic poles 47S and 47N of the screw member come near the stator coils 42 of the stator main body 41 one after another so that a DC current is induced in the stator coils 42. The generate DC current is supplied to the onboard battery 51 via the damper rod 13 and the current control unit 10. Thus, a part of the consumed electric power, such as when dark, can be supplied by the generated electric power, and the load on the alternator (not shown in the drawings) can be reduced.

Based on various detection signals (such as vehicle speed, lateral acceleration and vertical acceleration) received from the corresponding sensors, the damper ECU 9 sets a required target damping force and forwards a damping force command signal to the current control unit 10. For instance, when the vehicle makes a turn at high speed, a high lateral acceleration acts on the vehicle body. In such a case, the damper ECU9 supplies electric current from the onboard battery 51 to the damper 6 (stator coils 42 of the stator main body 41) via the current control unit 10 such that the rolling movement of the vehicle toward the outside of the curve can be reduced by increasing the damping forces of the dampers 6. At such a time, in the dampers on the inside of the curve, the rotor 33 is turned in clockwise direction at a prescribed speed so that the working fluid in the lower fluid chamber 15 may be forced into the upper fluid chamber 14. As a result, the upper fluid chamber 14 is pressurized, and the damper 6 is made stiffer against the extending movement (or the damping force in the extending direction is increased) so that the lifting of the part of the vehicle on the inside of the curve can be reduced. As for the dampers on the outside of the curve, the rotor 33 is turned in counterclockwise direction at a prescribed speed so that the working fluid in the upper fluid chamber 14 may be forced into the lower fluid chamber 15. As a result, the lower fluid chamber 15 is pressurized, and the damper 6 is made stiffer against the retracting movement (or the damping force in the retracting direction is increased) so that the sinking of the part of the vehicle on the outside of the curve can be reduced.

[Second Embodiment]

The second embodiment is similar to the first embodiment as far as the overall structure is concerned, and differs from the first embodiment in the structure of the piston. More specifically, as shown in FIG. 5, in the second embodiment, the stator 32 is fixed in an axially central part of the piston 16, and the rotor 33 is provided on the outside of the stator 32. As the mode of operation and the effect of the second embodiment are similar to those of the first embodiment, only the parts of the second embodiment that differ in structure from those of the first embodiment are described in the following.

As shown in FIG. 6 also, the stator 32 comprises a cylindrical stator main body 41 made of non-magnetic material such as aluminum and stator coils 42 incorporated in the outer periphery of the stator main body 41. The stator coils 42 are arranged along a concentric circle of the stator main body 41 as groups of four vertically aligned coils which are arranged at a regular angular interval of 45 degrees (and therefore include 32 coils). The stator main body 41 is formed with orifices 43 which communicate with the corresponding orifices 37a and 37b of the housing 31.

The rotor 33 comprises a cylindrical portion 49 supported by a bearing 39 of the housing 31 and a spiral screw member 46 formed on the inner circumference of the cylindrical portion 49. The screw member 46 is made of non-magnetic material such as aluminum, and is incorporated with magnetic poles 47S (S poles) and 47N (N poles) consisting of permanent magnets that are arranged in an alternating manner at an angular interval of 30 degrees as indicated by the cross hatched areas.

[Third Embodiment]

The third embodiment is also similar to the first embodiment as far as the overall structure is concerned, and differs from the first embodiment in the structure of the piston. More specifically, as shown in FIG. 7, in the third embodiment, a piston 16 for power generation and a piston 61 for damping are provided separately, and the rotor 33 is provided with screw members 62 similar to an aircraft propeller.

The piston 61 for damping is attached to the part of the damper rod 13 located above the piston 16 for power generation. The piston 61 for damping is disk-shaped, and is provided with a plurality of orifices 43 passed axially through the piston 61 and a pair of damping valves 34 and 35 for selectively closing the upper and lower ends of each orifice 43, respectively.

As shown in FIG. 8 also, the stator 32 comprises a cylindrical stator main body 41 made of non-magnetic material such as aluminum and stator coils 42 incorporated in the inner periphery of the stator main body 41. Similarly as in the first embodiment, the stator coils 42 are arranged along a concentric circle of the stator main body 41 as groups of four vertically aligned coils which are arranged at a regular angular interval of 30 degrees.

The rotor 33 comprises a shaft portion 45 supported by a bearing 39 of the housing 31 and six screw members 62 arranged coaxially around the outer periphery of the shaft portion 45 and each shaped like an aircraft propeller. Magnetic poles 47S (S poles) and 47N (N poles) are incorporated in the free ends of the blades of each screw member 62 in an alternating manner as indicated by the cross hatched areas.

The mode of operation of the third embodiment is similar to that of the first embodiment. However, because the piston 16 for power generation and the piston 61 for damping are provided separately, the freedom in the design of the individual pistons 16 and 61 can be improved.

The present invention was described in terms of specific embodiments, but the present invention is not limited by the illustrated embodiments. For instance, the present invention was applied to the energy regenerating damper for the rear suspension system of a four-wheeled vehicle in the foregoing embodiments, but is equally applicable to the front wheel suspension system and the suspension systems for a motorcycle. The rotor was provided with a spiral or propeller-shaped screw member in the foregoing embodiment, but the rotor may also be provided with an axial turbine. Also, the number and the layout of the magnetic poles on the rotor or those of the coils on the stator are not limited by the illustrated embodiments, but may be varied at will. The orifices for damping may be omitted if the induced electromotive force provides an adequate resistance to the rotation of the rotor or an adequate resistance to the flow of the working fluid. Further, the specific structures of the dampers and electric circuits may be modified without departing from the spirit of the present invention.

BRIEF DESCRIPTION OF THE SEVERAL VIEWS OF DRAWINGS

Figure 1:
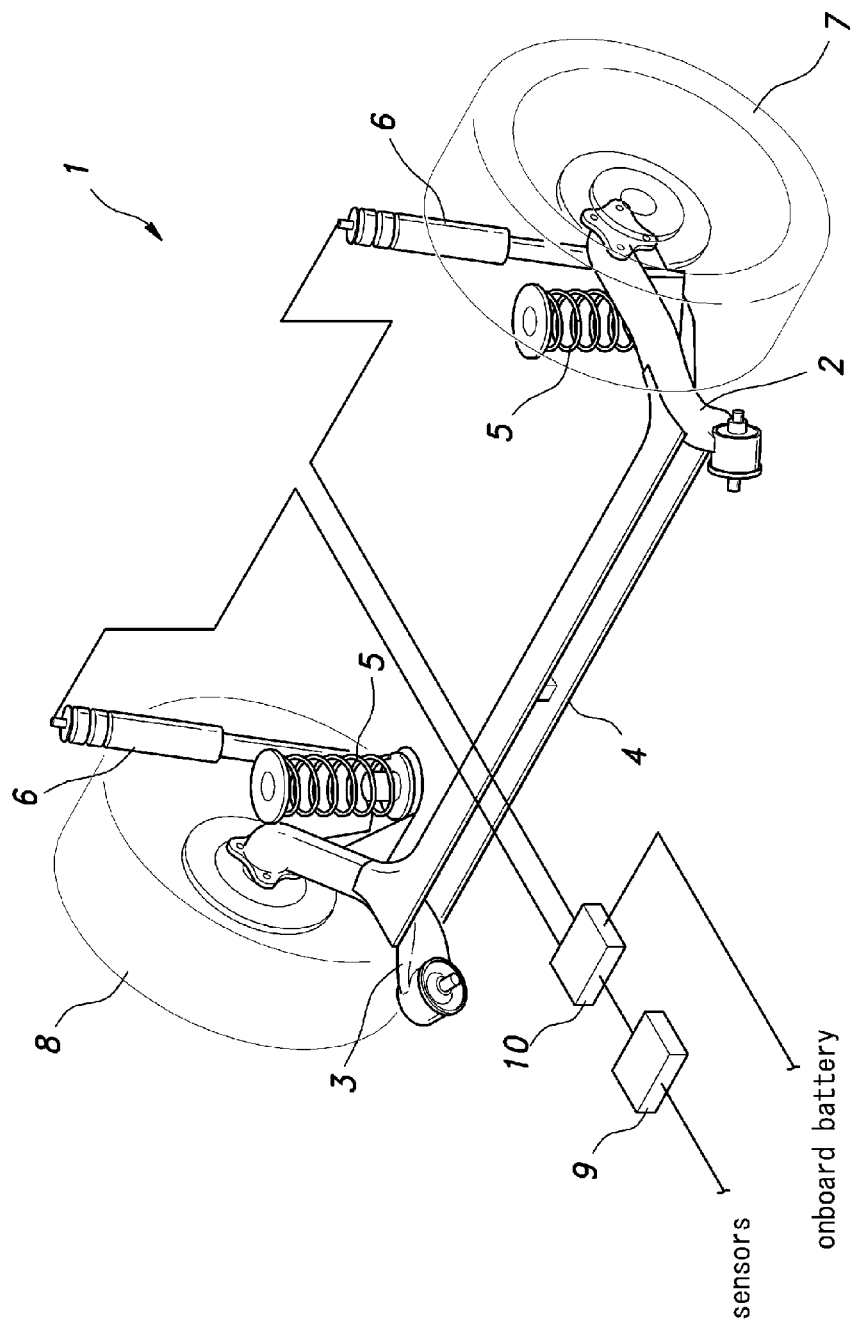
FIG. 1 is a perspective view of a rear suspension system according to a first embodiment of the present invention.
Figure 2:
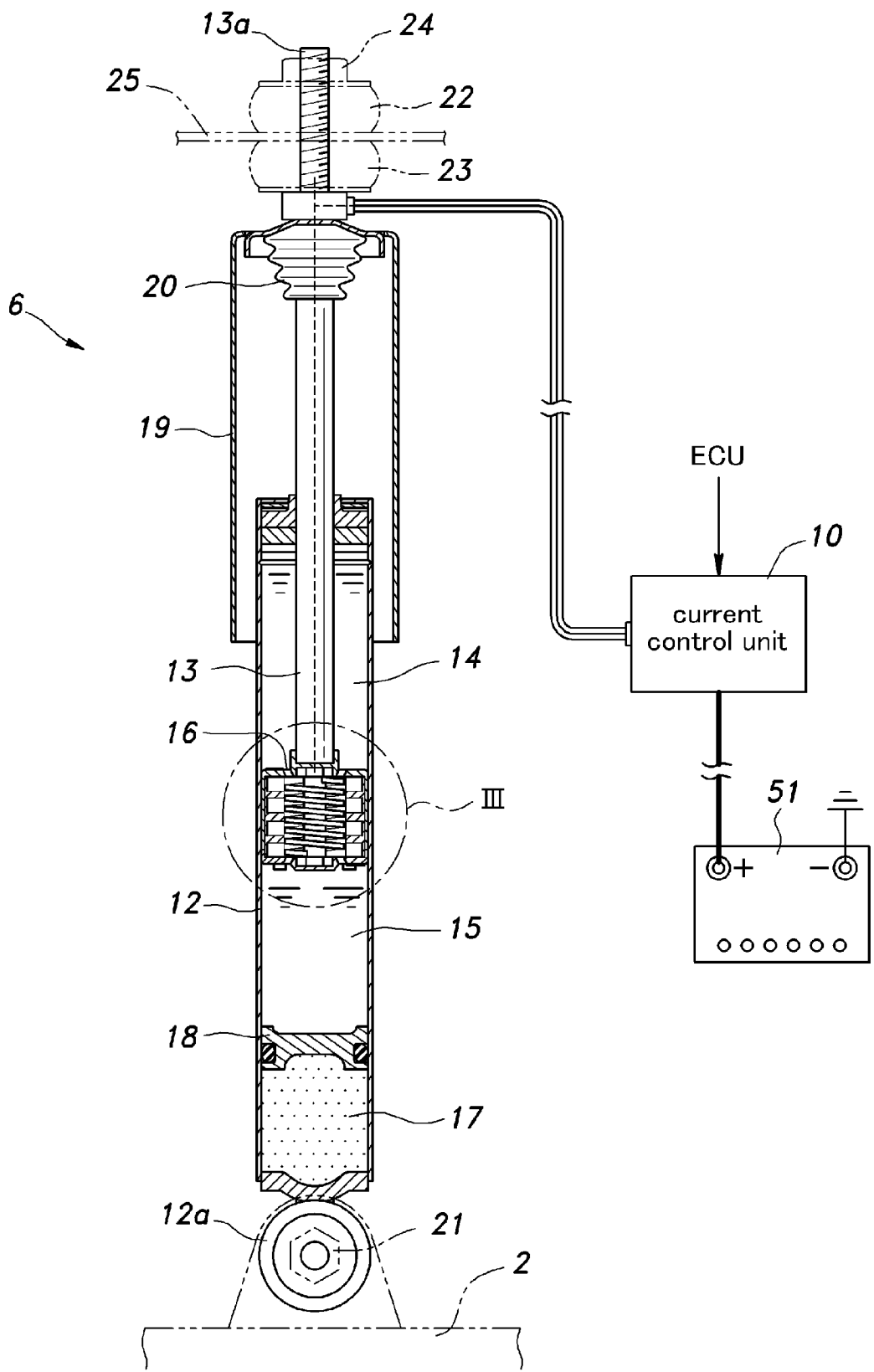
FIG. 2 is a vertical sectional view of a damper of the first embodiment.
Figure 3:
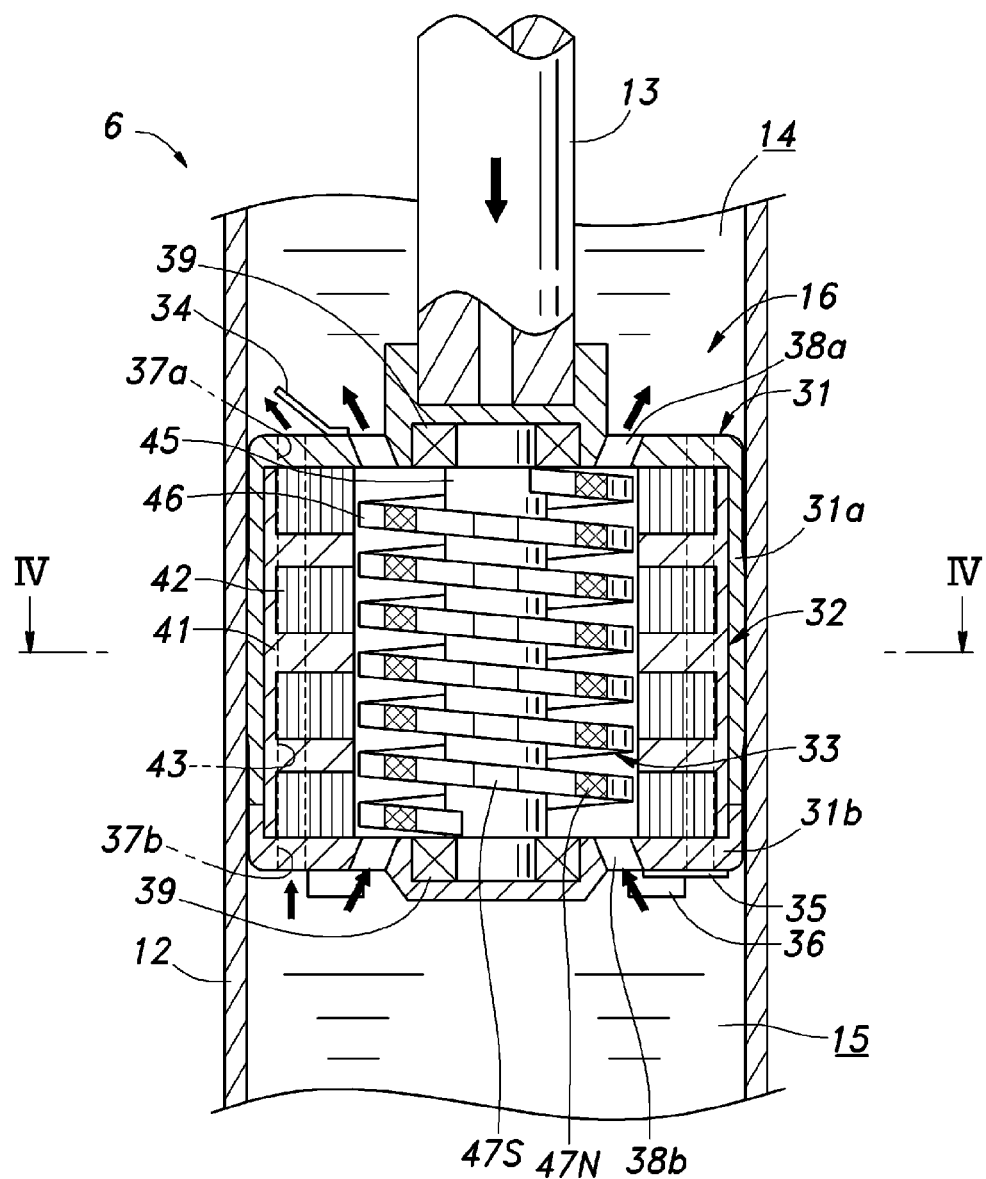
FIG. 3 is an enlarged view of a part indicated by III in FIG. 2.
Figure 4:
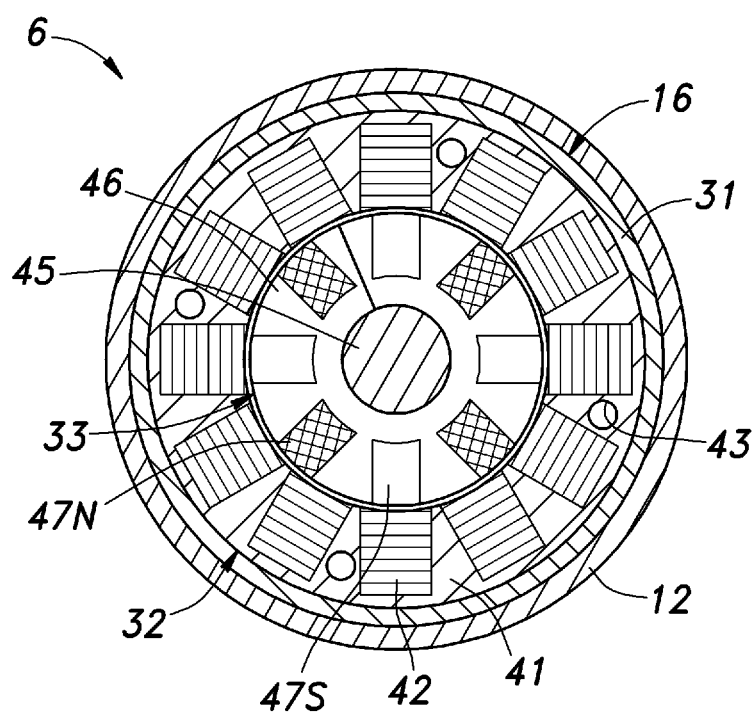
FIG. 4 is a sectional view taken along line IV-IV of FIG. 3.
Figure 5:
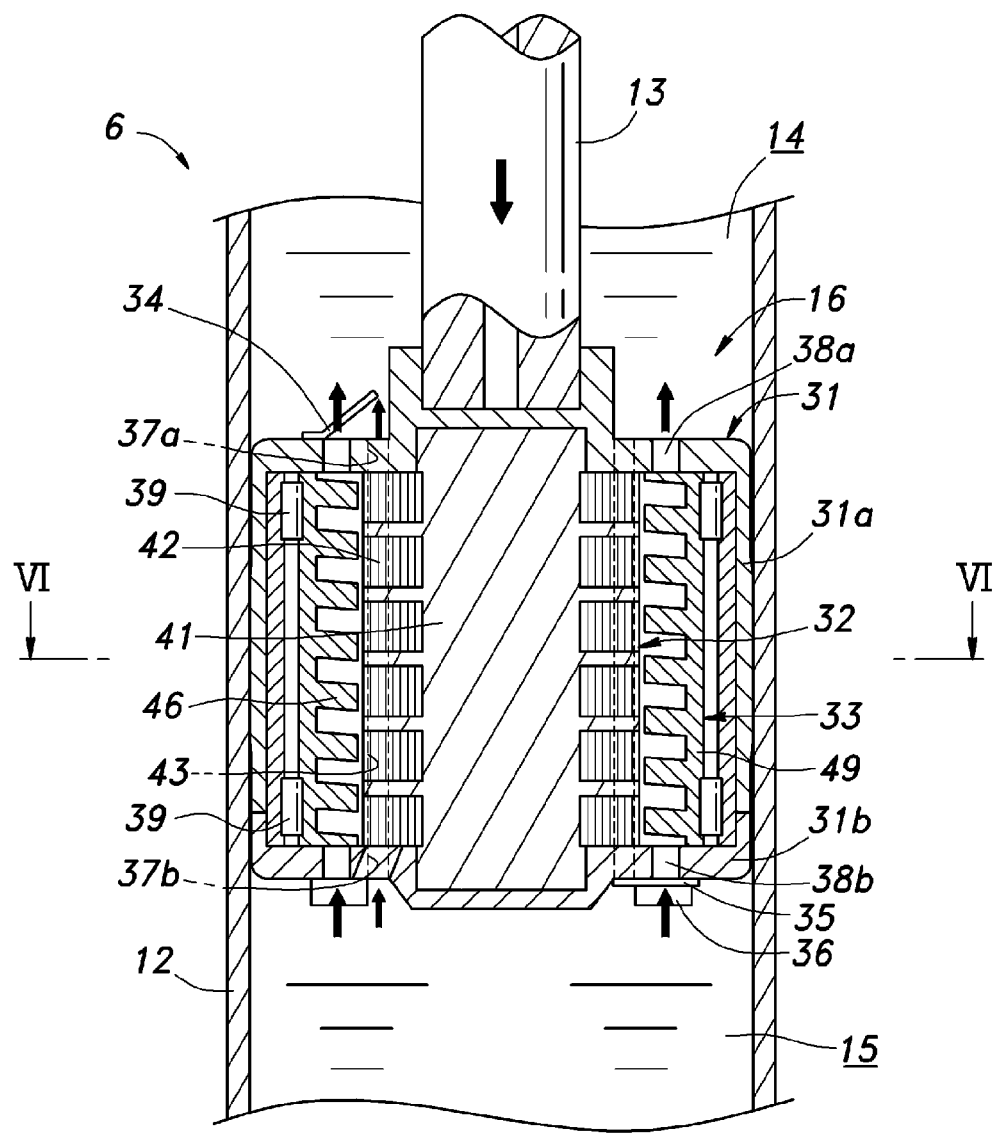
FIG. 5 is an enlarged vertical sectional view of an essential part of a damper according to a second embodiment of the present invention.
Figure 6:
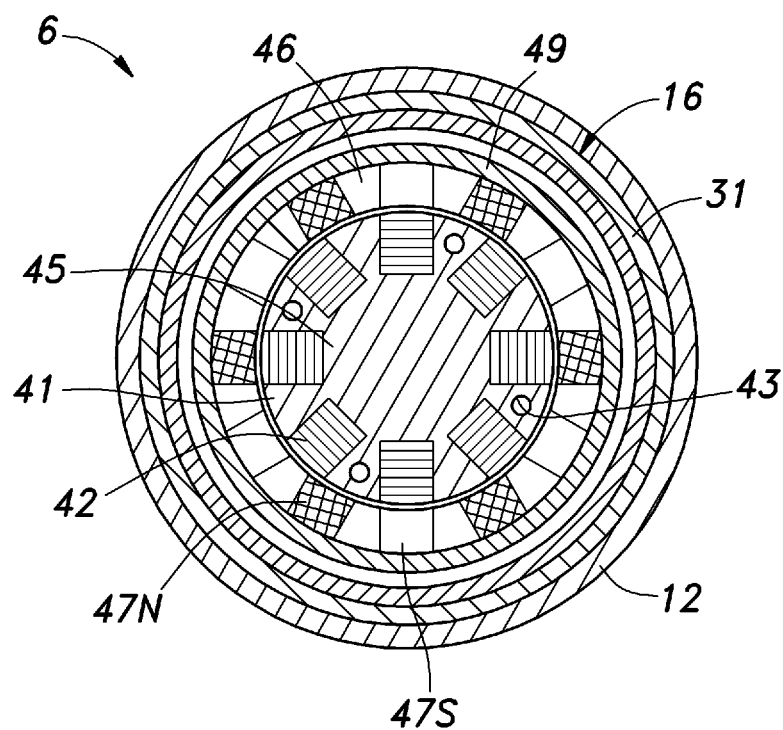
FIG. 6 is a sectional view taken along line VI-VI of FIG. 5.
Figure 7:
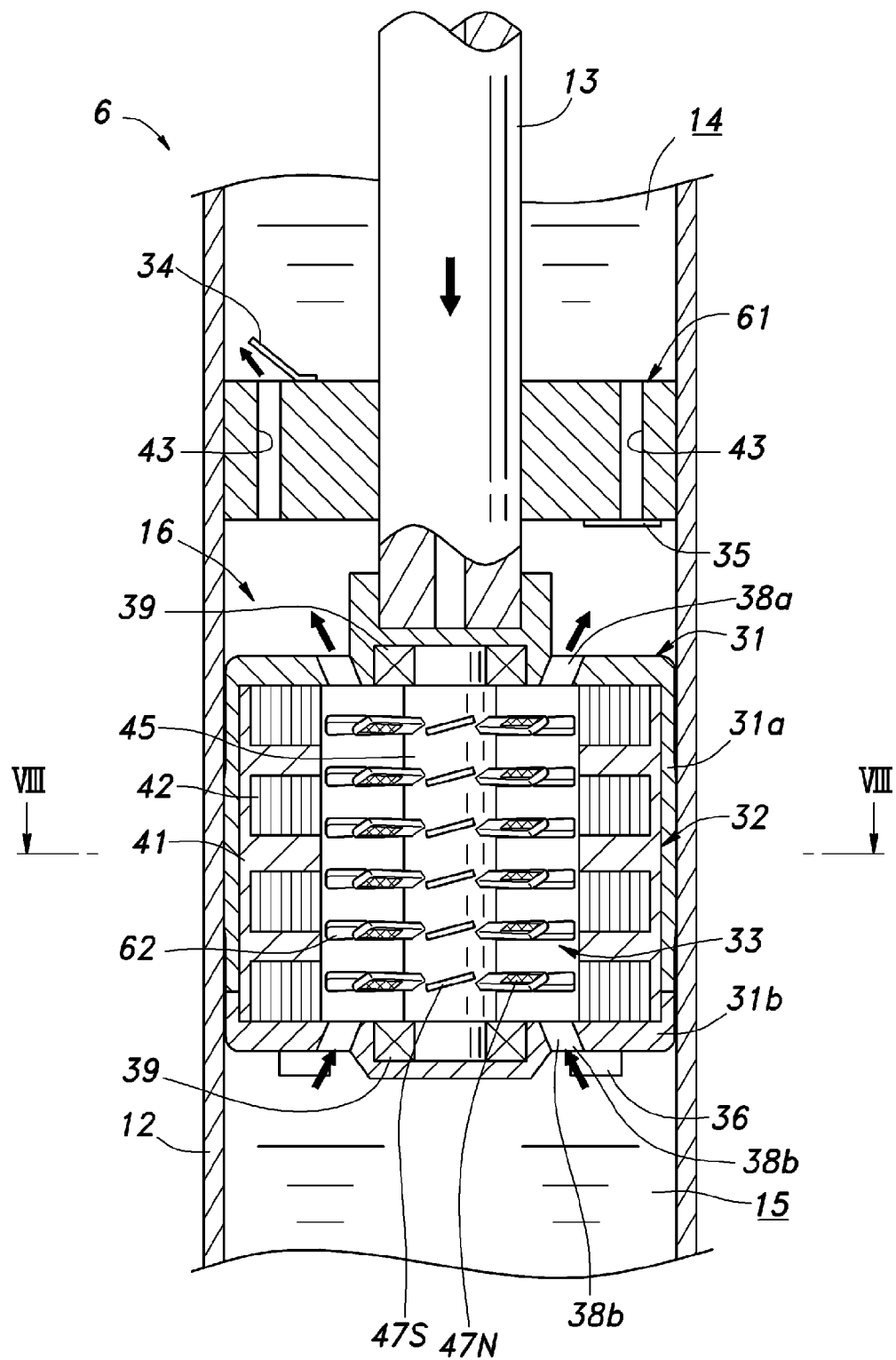
FIG. 7 is an enlarged vertical sectional view of an essential part of a damper according to a third embodiment of the present invention.
Figure 8:
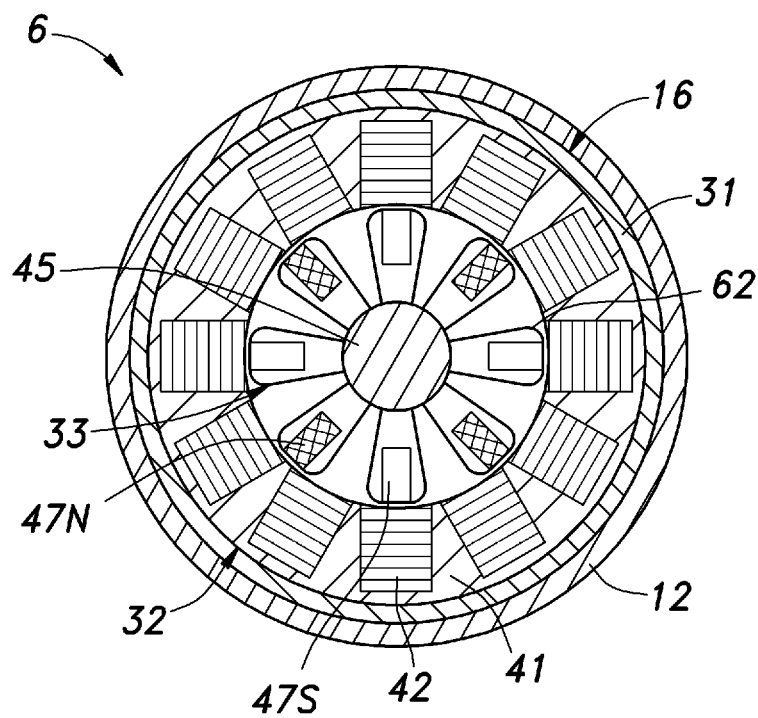
FIG. 8 is a sectional view taken along line VIII-VIII of FIG. 7.

GLOSSARY 2 trailing arm
6 damper
12 cylinder
13 damper rod
14 upper fluid chamber (first fluid chamber)
15 lower fluid chamber (second fluid chamber)
16 piston
25 damper base (vehicle side member)
31 housing
32 stator
33 rotor
42 stator coil
46 screw member
47S, 47N magnetic pole
61 piston
62 screw member

The invention claimed is:

1. An energy regenerating damper including a cylinder filled with fluid and connected to one of a vehicle side member and a wheel side member, a piston internally separating the cylinder into a first fluid chamber and a second fluid chamber and axially moveable in the cylinder, a rod connecting the piston to the other of the vehicle side member and the wheel side member and an energy regenerating unit;

wherein the energy regenerating unit comprises:

a stator integrally formed with the piston and provided with a plurality of stator coils; and a rotor rotatably supported in the piston and provided with a plurality of magnetic poles opposing the stator coils, the rotor being configured to be rotatively actuated by the fluid when the piston moves axially in the cylinder.

2. The energy regenerating damper according to claim 1, wherein the stator is provided with an annular or cylindrical shape, and the stator coils are formed on an inner circumference of the stator while the magnetic poles are formed on an outer circumference of the rotor.

3. The energy regenerating damper according to claim 1, wherein the rotor is provided with an annular or cylindrical shape, and the stator coils are formed on an outer circumference of the stator while the magnetic poles are formed on an inner circumference of the rotor.

4. The energy regenerating damper according to claim 1, wherein the piston is provided with a housing that slidably fitted in an inner circumference of the cylinder, and the stator and the rotor are received in the housing.

5. The energy regenerating damper according to claim 4, wherein the housing comprises a bearing supporting the rotor, a communication hole for conducting the fluid to the rotor and an orifice that applies a flow resistance to the fluid.

6. The energy regenerating damper according to claim 1, further comprising an electric current control unit interposed between an onboard battery and the energy regenerating unit, the electric current control unit selectively supplying electric current generated by the energy regenerating unit to the onboard battery and supplying drive electric current from the onboard battery to the rotor.

7. The energy regenerating damper according to claim 1, wherein the rotor is provided with a spiral or helical shape so as to be rotatively actuated by the fluid.

\* \* \* \* \*